(12) United States Patent
Shen et al.

(10) Patent No.: US 11,782,869 B2
(45) Date of Patent: Oct. 10, 2023

(54) DATA TRANSMISSION METHOD AND RELATED DEVICE

(71) Applicant: Huawei Technologies Co., Ltd., Shenzhen (CN)

(72) Inventors: Shengyu Shen, Hangzhou (CN); Yumin Wu, Hangzhou (CN); Weibin Lin, Hangzhou (CN); Jiangle Huang, Hangzhou (CN); Wenkai Ling, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/843,825

(22) Filed: Jun. 17, 2022

(65) Prior Publication Data

US 2022/0327094 A1 Oct. 13, 2022

Related U.S. Application Data

(63) Continuation of application No. PCT/CN2020/137602, filed on Dec. 18, 2020.

(30) Foreign Application Priority Data

Dec. 18, 2019 (CN) .......................... 201911312976.1

(51) Int. Cl.
*G06F 15/173* (2006.01)
*G06F 3/06* (2006.01)
(Continued)

(52) U.S. Cl.
CPC ...... *G06F 15/17331* (2013.01); *G06F 3/0631* (2013.01); *G06F 13/28* (2013.01); *H04L 67/1097* (2013.01)

(58) Field of Classification Search
CPC .. G06F 15/17331; G06F 3/0631; G06F 13/28; H04L 67/1097
See application file for complete search history.

(56) References Cited

U.S. PATENT DOCUMENTS 7,000,025 B1 2/2006 Wilson
10,153,985 B2 12/2018 Kim et al.
(Continued)

FOREIGN PATENT DOCUMENTS

CN 103902486 A 7/2014
CN 107104902 A 8/2017
(Continued)

OTHER PUBLICATIONS

Montazeri et al., "Homa: A Receiver-Driven Low-Latency Transport Protocol Using Network Priorities," SIGCOMM 18, Total 15 pages, Budapest, Hungary (Aug. 20-25, 2018).

*Primary Examiner* — Shean Tokuta
(74) *Attorney, Agent, or Firm* — Leydig, Voit & Mayer, Ltd.

(57) ABSTRACT

A data transmission method, performed by a receive end, includes: receiving notification information that is about to-be-transmitted data and that is sent by a transmit end, where the notification information includes a size of the to-be-transmitted data of the transmit end; generating a plurality of RDMA read requests based on the size of the to-be-transmitted data; and sending the plurality of RDMA read requests to the transmit end, where a bandwidth occupied by data read by the plurality of sent RDMA read requests is less than or equal to an ingress bandwidth of the receive end.

12 Claims, 4 Drawing Sheets

(51) Int. Cl.
*G06F 13/28* (2006.01)
*H04L 67/1097* (2022.01)

(56) References Cited

U.S. PATENT DOCUMENTS

| | | | |
|---|---|---|---|
| 11,102,129 B2* | 8/2021 | Burstein | H04L 47/283 |
| 2006/0101225 A1 | 5/2006 | Aloni et al. | |
| 2009/0083392 A1 | 3/2009 | Wong et al. | |
| 2016/0378712 A1 | 12/2016 | Amit et al. | |
| 2018/0102978 A1* | 4/2018 | Shen | H04L 69/14 |
| 2020/0084150 A1* | 3/2020 | Burstein | H04L 47/805 |
| 2020/0089649 A1* | 3/2020 | Pandya | H04L 49/9031 |
| 2021/0152494 A1* | 5/2021 | Johnsen | H04L 47/805 |
| 2022/0327094 A1* | 10/2022 | Shen | G06F 13/28 |

FOREIGN PATENT DOCUMENTS

| | | | | |
|---|---|---|---|---|
| CN | 109743143 A | | 5/2019 | |
| CN | 109976661 A | | 7/2019 | |
| CN | 110460533 A | | 11/2019 | |
| EP | 4057152 A1 * | | 9/2022 | G06F 13/28 |
| WO | WO-2021121386 A1 * | | 6/2021 | G06F 13/28 |

* cited by examiner

DATA TRANSMISSION METHOD AND RELATED DEVICE

CROSS-REFERENCE TO RELATED APPLICATIONS

This application is a continuation of International Application No. PCT/CN2020/137602, filed on Dec. 18, 2020, which claims priority to Chinese Patent Application No. 201911312976.1, filed on Dec. 18, 2019. The disclosures of the aforementioned applications are hereby incorporated by reference in their entireties.

TECHNICAL FIELD

This application relates to the communication field, and in particular, to a data transmission method and a related device.

BACKGROUND

In a data transmission process, when congestion occurs on a data link because there are a large quantity of data packets on the data link or when congestion occurs at an ingress of a receive end because a large amount of data needs to pass through the ingress of the receive end within a short period of time, a delay of receiving a data packet by the receive end is increased. In this case, the receive end may send, to a transmit end, an indication message indicating an amount of data to be sent by the transmit end per unit of time. This controls an amount of data transmitted on the data link and an amount of data arriving at the ingress of the receive end per unit of time, and reduces a data transmission delay. However, in the foregoing method, after the receive end sends the indication message to the transmit end, the transmit end may fail to send data to the receive end in time because a processor is busy and cannot process the indication message in time. Consequently, an ingress bandwidth of the receive end is wasted.

Remote direct memory access (RDMA) is a technology for directly performing remote memory access. According to the technology, data can be directly transmitted from one system to a storage area of another remote system without participation of a central processing unit (CPU). After receiving a RDMA read request from the receive end, a network adapter at the transmit end may directly read data from a memory of the transmit end and send the data to the receive end. In this way, the ingress bandwidth of the receive end is not wasted. However, in the foregoing method, when the transmit end needs to send a large amount of data, the receive end needs to generate a plurality of RDMA read requests and send all of the plurality of RDMA read requests to the transmit end. After receiving the plurality of RDMA read requests, the transmit end immediately sends data to the receive end, and the receive end receives a large quantity of data packets within a short period of time. Consequently, congestion occurs at the ingress of the receive end, and the duration for the data to arrive at the receive end is increased.

SUMMARY

Embodiments of this application disclose a data transmission method and a related device, to resolve a congestion problem occurring at an ingress of a receive end during data transmission.

According to a first aspect, an embodiment of this application provides a data transmission method, including:

A receive end receives notification information that is about to-be-transmitted data and that is sent by a transmit end, where the notification information includes a size of the to-be-transmitted data of the transmit end; after receiving the notification information, the receive end generates a plurality of RDMA read requests based on the size of the to-be-transmitted data; the receive end sends the plurality of RDMA read requests to the transmit end, where a bandwidth occupied by data read through the plurality of sent RDMA read requests is less than or equal to an ingress bandwidth of the receive end; and the receive end receives a response message sent by the transmit end through the RDMA read request, where the response message carries data read through the RDMA read request.

According to the foregoing method, after generating the plurality of RDMA read requests, the receive end sends the plurality of RDMA read requests to the transmit end in several times, and controls a quantity of RDMA read requests sent each time. In this way, a bandwidth occupied by data read through the RDMA read requests that are sent each time is less than or equal to the ingress bandwidth of the receive end. This avoids congestion at an ingress of the receive end, and reduces a data transmission delay.

In an embodiment, that the receive end sends the plurality of RDMA read requests to the transmit end includes:

After receiving the notification information that is about the to-be-transmitted data and that is sent by the transmit end, the receive end determines a quantity of RDMA read requests sent to the transmit end for a first time, where the quantity of RDMA read requests sent to the transmit end for the first time is determined by the receive end based on the ingress bandwidth of the receive end and a size of data read through each RDMA read request; and the receive end sends the determined quantity of RDMA read requests to the transmit end.

According to the foregoing method, before sending the RDMA read requests for the first time, the receive end determines, based on the ingress bandwidth of the receive end and the size of the data read through each RDMA read request, the quantity of the RDMA read requests that can be sent by the receive end for the first time. In this way, after the receive end sends the RDMA read request for the first time and before the receive end sends one or more RDMA read requests for a second time, a data amount of a response message received by the receive end per unit of time is less than or equal to the ingress bandwidth of the receive end. This can avoid ingress congestion that occurs because the data amount received by the receive end per unit of time is more than the ingress bandwidth, and can reduce a data transmission delay.

In an embodiment, that the receive end sends the plurality of RDMA read requests to the transmit end includes:

After sending the determined quantity of RDMA read requests to the transmit end for the first time, and before sending one or more RDMA read requests to the transmit end for an $n^{th}$ time, the receive end determines a quantity of response messages received after the receive end sends one or more RDMA read requests to the transmit end for an $(n-1)^{th}$ time, where n is an integer greater than or equal to 2; the receive end determines, based on the quantity of response messages received after sending the RDMA read requests to the transmit end for the $(n-1)^{th}$ time, a quantity of the RDMA read requests that are sent for the $n^{th}$ time; and the receive end sends to the transmit end, the determined quantity of the RDMA read requests that are sent for the $n^{th}$ time.

According to the foregoing method, after the receive end sends the RDMA read request for the first time, and before the receive end sends one or more RDMA read requests each time after the first time, the receive end needs to determine, before sending one or more RDMA read requests this time, a quantity of response messages received by the receive end after one or more RDMA read requests are sent last time before the receive end sends the RDMA read requests this time. The receive end determines, based on the quantity of response messages received by the receive end, a quantity of RDMA read requests that are sent this time. This limits a data amount received by the receive end for a response message received per unit of time within a time interval between two transmissions of RDMA read requests. The data amount of the response message received per unit of time is less than or equal to an ingress bandwidth of the receive end. This can avoid ingress congestion that occurs because the data amount received by the receive end per unit of time is more than the ingress bandwidth, and can reduce a data transmission delay.

In an embodiment, after that the receive end generates a plurality of RDMA read requests based on the size of the to-be-transmitted data, the method further includes:

The receive end generates a data structure, where the data structure includes a plurality of bits, and one of the plurality of bits corresponds to one of the plurality of RDMA read requests; after receiving a response message for the RDMA read request, the receive end changes a bit that is in the data structure and that corresponds to the RDMA read request to a preset bit value, to indicate that the response message for the RDMA read request is received; and when all bits in the data structure are the preset bit value, the receive end determines that transmission of the to-be-transmitted data is completed.

The data structure is generated at the receive end. After receiving a response message for one RDMA read request, the receive end changes a corresponding bit that is in the data structure and that corresponds to the RDMA read request to the preset bit value, so that the receive end can determine whether all of to-be-transmitted data is received based on a value of the bit in the data structure.

According to second aspect, an embodiment of this application provides a data transmission apparatus, including:
  a receiving unit, configured to receive notification information that is about to-be-transmitted data and that is sent by a transmit end, where the notification information includes a size of the to-be-transmitted data;
  a processing unit, configured to generate a plurality of RDMA read requests based on the size of the to-be-transmitted data;
  a sending unit, configured to send the plurality of RDMA read requests to the transmit end, where a bandwidth occupied by data read through the plurality of sent RDMA read requests is less than or equal to an ingress bandwidth of the data transmission apparatus; and
  the receiving unit, further configured to receive a response message sent by the transmit end for the RDMA read request, where the response message carries data read through the RDMA read request.

In an embodiment, the processing unit is specifically configured to: after the receiving unit receives the notification information that is about the to-be-transmitted data and that is sent by the transmit end, determine a quantity of RDMA read requests sent to the transmit end for a first time, where the quantity of RDMA read requests sent to the transmit end for the first time is determined by the data transmission apparatus based on the ingress bandwidth of the data transmission apparatus and a size of data read through each RDMA read request; and
  the sending unit is specifically configured to send the determined quantity of RDMA read requests to the transmit end.

In an embodiment, the processing unit is specifically configured to: after the determined quantity of RDMA read requests are sent to the transmit end for the first time, and before one or more RDMA read requests are sent to the transmit end for an $n^{th}$ time, determine a quantity of response messages received after the data transmission apparatus sends one or more RDMA read requests to the transmit end for an $(n-1)^{th}$ time, where n is an integer greater than or equal to 2; and
  determine, based on the quantity of response messages received after the RDMA read requests are sent to the transmit end for the $(n-1)^{th}$ time, a quantity of the RDMA read requests that are sent for the $n^{th}$ time; and
  the sending unit is specifically configured to send, to the transmit end, the determined quantity of the RDMA read requests that are sent for the $n^{th}$ time.

In an embodiment, the apparatus further includes:
  a generation unit, configured to generate a data structure, where the data structure includes a plurality of bits, and one of the plurality of bits corresponds to one of the plurality of RDMA read requests; and
  the processing unit is further configured to: after the data transmission apparatus receives a response message for the RDMA read request, change a bit that is in the data structure and that corresponds to the RDMA read request to a preset bit value, to indicate that the response message for the RDMA read request is received; and
  when all bits in the data structure are the preset bit value, determine that transmission of the to-be-transmitted data is completed.

According to a third aspect, an embodiment of this application provides a network adapter, including a processor and a memory. The memory is configured to store instructions. The processor is configured to execute the instructions. When executing the instructions, the processor implements the method in any one of the first aspect or the possible embodiments of the first aspect.

According to a fourth aspect, an embodiment of this application provides a network device. The network device includes the network adapter according to the third aspect.

According to a fifth aspect, an embodiment of this application provides a non-transient computer readable storage medium. The computer readable storage medium stores a computer program, and when the computer program is executed by a receive end, the method in any one of the first aspect or the possible embodiments of the first aspect is implemented.

BRIEF DESCRIPTION OF DRAWINGS

To describe technical solutions in embodiments of this application more clearly, the following briefly introduces accompanying drawings for describing the embodiments. It is clear that the accompanying drawings in the following description show merely some embodiments of this application, and a person of ordinary skill in the art may still derive other drawings from these accompanying drawings without creative efforts.

DESCRIPTION OF EMBODIMENTS

Figure 1:
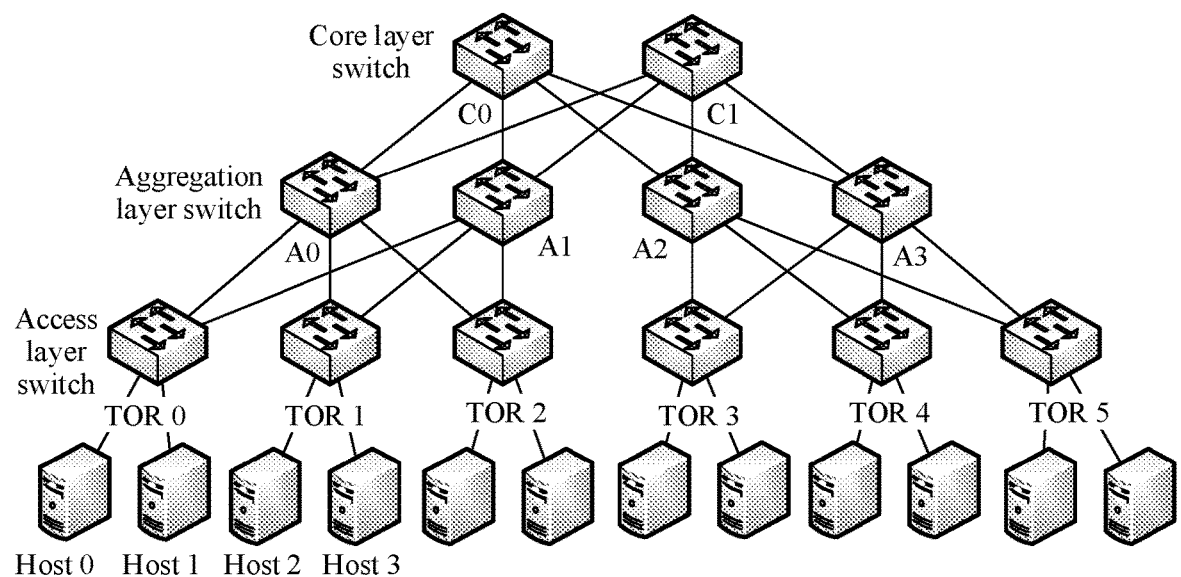
FIG. 1 is a schematic diagram of a data center network architecture according to an embodiment of this application.

To help a person skilled in the art better understand the technical solutions in this application, some concepts used in embodiments of this application are first described.

Remote direct memory access (RDMA) is a technology for directly performing remote memory access. According to the technology, data can be directly transmitted from one system to a storage area of another remote system without participation of operating systems and central processing units (CPU) of the two systems. In this way, overheads caused by data replication in user space and kernel space can be eliminated, and a delay problem of data processing between a client and a host end in network transmission can be resolved.

A maximum transmission unit (MTU) represents a maximum size of data that can be transmitted on a data link, is a maximum length of a data packet or a data frame on the data link, and is generally in a unit of a byte. For example, in the Ethernet, a value of the MTU is 1500 bytes. If the data packet is excessively large, it cannot be forwarded by a router when passing through the router. In a data center and high performance computing (HPC), data is usually transmitted by using a transmission control protocol (TCP) or RDMA. A size of a message sent by a transmit end each time changes dramatically, ranging from several bytes to several gigabytes (GB). If a data amount of the message is large, a device divides the message into a plurality of data packets for sending. A maximum size of each data packet is the MTU.

A network interface controller (NIC) is also referred to as a network adapter. The NIC is a computer hardware designed to allow computers to communicate on a network. A host NIC is used to connect one host to another host or establish a connection between a host and a network device like a switch.

A bandwidth refers to an amount of data that can pass through a link per unit of time, and is represented in a unit of a bit per second (bps), usually in a unit of a megabit per second (Mbps). An ingress bandwidth refers to an amount of data that can be received by an interface of a device per unit of time.

Dynamic routing means that a router can automatically establish a routing table according to a preset optimization algorithm by exchanging information between interconnected routers, and adjust the routing table based on an actual situation. After receiving a data packet, the router may find an appropriate data transmission path according to the routing table. For example, the path has a small quantity of nodes, a light load, a low latency, and the like.

Credit refers to a capability of a device to receive data. The credit determines the data receiving capability of the device. If a receive end does not issue any credit to a transmit end, the transmit end cannot send any data to the receive end.

A message passing interface (MPI) is a message passing mechanism. The MPI defines a group of functions, so that an application program can transmit a message from one MPI process to another MPI process.

FIG. 1 is a schematic diagram of a data center network architecture according to an embodiment of this application. The data center network architecture usually includes an access layer, an aggregation layer, and a core layer. An access layer switch is usually located at the top of a rack of a host, and is usually referred to as a top of rack (TOR) switch. The host is connected to a TOR switch in a host cabinet, so as to implement, in the cabinet, a connection between the host and a switch. An aggregation layer switch is connected to the access layer switch, to forward data from the aggregation layer to the access layer, and provide services such as a firewall, intrusion detection, and network analysis. A core layer switch forwards a data packet that is sent to and from the data center, to provide an elastic L3 routing network for the data center. It should be noted that a core concept of the TOR is to deploy a switch in the host cabinet. The switch may be deployed at the top of the cabinet, or may be deployed in the middle or at the bottom of the cabinet. This is not specifically limited in this embodiment of this application.

In a data transmission process, network congestion is an important reason for a long data transmission delay. As shown in FIG. 1, an access layer switch TOR 0 is connected to a host 0 and a host 1, an access layer switch TOR 1 is connected to a host 2 and a host 3, and both the TOR 0 and the TOR 1 are connected to an aggregation layer switch A0 and an aggregation layer switch A1. When the host 1 is a transmit end, the host 3 is a receive end, and a large amount of data needs to be transmitted between the host 1 and the host 3, congestion occurs on a link between the host 1 and the host 3. For example, congestion occurs on a link "host 1-TOR 0-A0-TOR 1-host 3". However, a data packet that is transmitted between a transmit end host 0 and a receive end host 2 also needs to pass through a link "TOR 0-A0-TOR 1". As a result, a large delay is caused when the data packet passes through the link "TOR 0-A0-TOR 1". It should be noted that each access layer switch in FIG. 1 is connected to only two aggregation layer switches. In an actual network, one access layer switch may be further connected to more aggregation layer switches to provide more communication links between two hosts.

To resolve a delay problem caused by network congestion, the following three policies are usually used: a method based on transmit rate control for a transmit end, a method based on credit control for a receive end, and a method based on anti-pull control for a receive end.

The method based on transmit rate control for the transmit end is marking, by using a switch or a router, a data packet on which congestion occurs, and sending congestion information to the transmit end by a receive end that receives the marked data packet on which congestion occurs. The congestion information indicates to the transmit end that congestion occurs on a network. After receiving the congestion information, the transmit end reduces a data packet transmit rate to reduce traffic injected into the network. After the transmit end no longer receives the congestion information, the transmit end gradually increases the transmit rate. For example, as shown in FIG. 1, if a large amount of data needs to be transmitted between the host 1 and the host 3, congestion occurs on a link between the host 1 and the host 3. For example, congestion occurs on a link "host 1-TOR 0-A0-TOR 1-host 3". When congestion occurs on the aggregation layer switch A0, a data packet on which congestion occurs and that passes through the A0 is marked as a congested data packet. After receiving data marked as a congested data packet, the host 3 sends a congestion notification packet (CNP) to the host 0. The CNP is used to notify the host 0 of network congestion. After receiving the CNP, the host 0 reduces the packet transmit rate to relieve network congestion. After the network congestion is relieved, the host 0 increases the packet transmit rate again.

In the foregoing method, after the transmit end receives the CNP, the transmit end reduces the packet transmit rate to reduce traffic injected into the network. After network congestion is relieved, the transmit end increases the packet transmit rate to increase traffic injected into the network. In this case, network congestion occurs again, and the transmit end needs to reduce the transmit rate again. Consequently, traffic flapping is caused on the network.

In the method based on credit control for the receive end, when the transmit end needs to send data to the receive end, the transmit end first sends a piece of notification information to the transmit end. The notification information includes a size of data that needs to be sent by the transmit end. After receiving the notification information, the receive end sends a credit message to the transmit end. The credit message includes credit allocated by the receive end to the transmit end. The credit indicates an amount of data that can be sent by the transmit end to the receive end. The data amount may be determined by the receive end based on an ingress bandwidth of the receive end, or may be determined by the receive end based on a size of buffer space used by the receive end to buffer data. After receiving the credit message, the transmit end sends data to the receive end based on the credit in the credit message. For example, a size of data that needs to be sent by the host 1 is 5 megabytes (MB), and an ingress bandwidth of the host 3 is 8 Mbps. To be specific, an ingress of the host 3 may receive 1 MB data per second, and a size of buffer space used by the host 3 to buffer data is 2 MB. A size of credit sent to the host 1 is 1 MB, to be specific, the host 1 can send only 1 MB data to the host 3 per second. This ensures that congestion does not occur at the ingress of the host 3. After receiving the credit message sent by the host 3, the host 1 sends data to the host 3 based on the credit in the credit message.

In the foregoing method based on credit control for the receive end, after the receive end sends the credit message to the transmit end, the transmit end may not respond to the credit message from the receive end in time, and may not send a data packet to the receive end immediately after receiving the credit message. The receive end needs to wait for the transmit end to send the data packet. Consequently, the ingress bandwidth of the receive end is wasted.

In the method based on anti-pull control for the receive end, a network adapter at the transmit end and a network adapter at the receive end need to support an RDMA function. When the transmit end needs to send data to the receive end, the transmit end first sends a piece of notification information to the receive end. The notification information includes a size of data that needs to be sent by the transmit end and a start address (address 0) of the data in memory space. After receiving the notification information, the receive end generates a plurality of RDMA read requests based on the start address and the size of the data in the notification information, sends a RDMA read request to the transmit end, and directly reads, from memory space of the transmit end, data that needs to be sent by the transmit end. Because a size of a data packet that can be transmitted on a data link each time is an MTU, when a size of data that needs to be read by the receive end is greater than the MTU, the receive end needs to generate a plurality of read requests, and the data that needs to be sent by the transmit end can be all read only through the plurality of read requests. Each read request includes a start address and a size of data that needs to be read based on the read request. For example, if the size of the data that needs to be sent by the transmit end is 5 MB, and the MTU of the data link is 2 kilobytes (KB), the receive end needs to send $5*2^9$ read requests to the transmit end. A size of data read through each read request is 2 KB.

In the foregoing method based on anti-pull control for the receive end, after the receive end generates the plurality of read requests based on the size and the start address (address 0) of the data that needs to be read, the receive end sends all of the plurality of read requests to the transmit end. After receiving all of the read requests, the network adapter at the transmit end reads data that needs to be read through the plurality of read requests from storage space, and sends the data to the receive end via dynamic routing. In this case, congestion may occur at the ingress of the receive end due to a limited ingress bandwidth of the receive end. For example, in FIG. 1, the transmit end is the host 1, and the receive end is the host 3. If the size of the data that needs to be sent by the transmit end is 5 MB, and the MTU of the data link is 2 kilobytes (KB), the receive end needs to send $5*2^9$ read requests to the transmit end. A size of data read through each read request is 2 KB. If an ingress bandwidth of the host 3 is 8 Mbps, an ingress of the host 3 can receive 1 MB data per second. The 1 MB data corresponds to data read through 512 read requests. After receiving the $5*2^9$ read requests, the host 1 may respond to more than 512 read requests per second, for example, 600 read requests. In this case, a size of data received by the receive end per second exceeds 1 MB. Consequently, congestion occurs at the ingress of the host 3.

Figure 2:
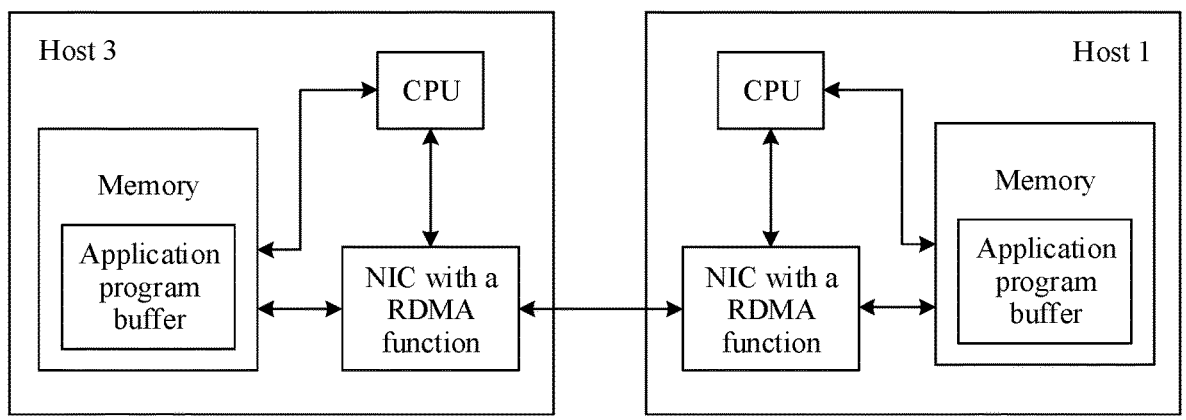
FIG. 2 is a schematic diagram of a structure of a host according to an embodiment of this application.

To resolve the foregoing problem, an embodiment of this application provides a data transmission method. The method is applied to the network shown in FIG. 1. Each host includes at least a CPU, a memory, and a network adapter supporting an RDMA function. The memory includes an application program buffer that is used to store data and that is applied for by an application program running on the host. As shown in FIG. 2, two hosts in FIG. 2 are connected to a network in a manner shown in FIG. 1. For example, the two hosts in FIG. 2 may be respectively the host 1 and the host 3 in FIG. 1. When the host 1 needs to send data to the host 3, the host 1 first sends one piece of notification information to the host 3. The notification information includes a size and a start address of target data that needs to be sent by the host 1. The host 3 generates a plurality of RDMA read requests based on the size and the address of the target data, then, determines a quantity of RDMA read requests sent to the host 1 each time based on an ingress bandwidth, and sends the plurality of generated RDMA read requests to the host 1 in several times.

Reading data from the transmit end through an RDMA read request may avoid a problem that in the foregoing method based on credit control for the receive end, the ingress bandwidth of the receive end is wasted when the transmit end cannot respond to the credit message of the receive end in time. In addition, the receive end sends a plurality of generated RDMA read requests to the transmit end in several times, to control a data amount returned by the transmit end based on RDMA read requests within a time interval between two transmissions of the RDMA read requests by the receive end. This avoids traffic flapping on the network and avoids congestion that occurs at the ingress of the receive end because the data amount received by the receive end within the time interval exceeds the ingress bandwidth.

Figure 3:
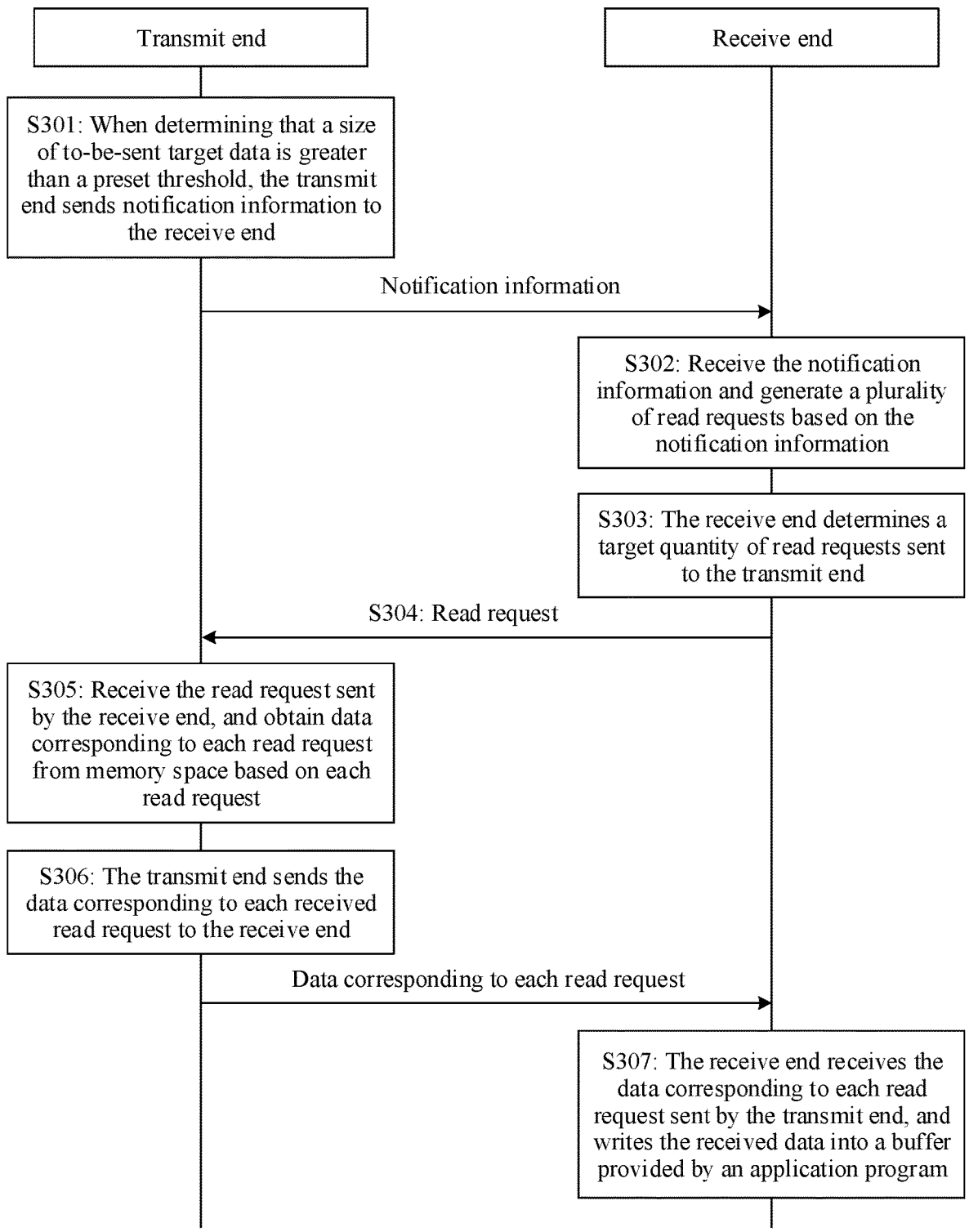
FIG. 3 is a schematic diagram of a data interaction according to an embodiment of this application.

FIG. 3 is a schematic diagram of a data interaction according to an embodiment of this application. It should be noted that both a transmit end and a receive end described in the following embodiments have a structure and a connection manner that are the same as those of the foregoing host, and a read request in the following embodiments is an RDMA read request.

S301: When determining that a size of to-be-sent target data is greater than a preset threshold, the transmit end sends notification information to the receive end.

In this embodiment of this application, the notification information includes a size of target data that needs to be sent by the transmit end and address information of the target data. The notification information indicates the size of the target data that needs to be sent by the transmit end and that needs to be received by the receive end and the address information of the target data. The size of the target data indicates a byte length of the target data, and the address information of the target data indicates a storage address of the target data in memory space of the transmit end. The preset threshold may be an MTU of a data link, or may be dynamically configured. For example, the preset threshold may be equivalent to a value of five times the MTU. The address information may be a start address of the target data in the memory space, or may be a start address and an end address of the target data in the memory space. In this embodiment of this application, an example in which the address information is the start address of the target data in the memory space of the transmit end is used for description.

When the transmit end needs to send data to the receive end, the transmit end determines whether a byte length of target data that needs to be sent is greater than or equal to a preset threshold. If the byte length of the target data that needs to be sent is greater than or equal to the preset threshold, the transmit end sends the notification information to the receive end. If the transmit end determines that the byte length of the target data that needs to be sent is smaller than the preset threshold, the transmit end may send the target data to the receive end through a single data packet, or the transmit end divides the target data to generate a plurality of data packets, and sends the target data to the receive end through the plurality of data packets. This is not specifically limited in this embodiment of this application. For example, the preset threshold is equivalent to a value of four times the MTU, and a value of an MTU is 1000 bytes. When a size of the target data is 900 bytes, the transmit end may send the target data to the receive end through a data packet. When a size of the target data is 2500 bytes, the transmit end divides the target data into three data packets. For example, the first two data packets each include 1000 bytes, and the third data packet includes 500 bytes. Then, the transmit end sequentially sends the three data packets to the receive end.

S302: The receive end receives the notification information, and generates a plurality of read requests based on the notification information.

After receiving the notification information, the receive end generates the plurality of read requests based on the size and the address information of the target data in the notification information. Each read request includes a start address and a size of a segment of data that needs to be read and a sequence number i of the read request. A size of data read through each read request is less than or equal to the MTU, and a plurality of segments of data that needs to be read through the plurality of read requests are combined into the target data. The sequence number of each read request indicates a sequence of the read request in the plurality of read requests. A minimum address in the plurality of read requests is a start address (address 0) in the notification information, and a maximum address is an address 0+size−1.

The receive end determines a quantity of the generated read requests based on a size L of data read through each read request and a size of target data in the received notification information, and determines a start address in each read request based on the size L of the data read through each read request and the start address (address 0) in the received notification information. A value range of a quantity N of the read requests generated by the receive end is [size/L, (size+L)/L), and N is a positive integer, that is, a value of N is a rounded-up value of size/L. If a value of the size of the target data is an integer multiple of L, that is, N=size/L, a size of data that needs to be read through each of the N read requests is L. If a memory area corresponding to each address stores a byte of data, a start address in each read request is address 0+(i−1)*L, and an address interval corresponding to a start address and an end address of data that needs to be read through each read request is <address 0+(i−1)*L: address 0+i*L−1)>, where i is a sequence number of the read request, indicates an $i^{th}$ read request, and i is an integer greater than 0 and less than or equal to N.

If a value of the size of the target data is not an integral multiple of L, and a remainder of size/L is M, a size of data that needs to be read through each of the first N−1 read requests is L, a size of data that needs to be read through the $N^{th}$ read request is M, and a start address in each read request is address 0+(i−1)*L. An address interval corresponding to each of the first N−1 read requests is <address 0+(i−1)*L: address 0+i*L−1)>, where i is an integer greater than 0 and less than or equal to N−1, and an address interval corresponding to a start address and an end address in the $N^{th}$ read request is <(N−1)*L+address 0:(N−1)*L+address 0+M−1>.

For example, if L=10 bytes, the size of the target data is 45 bytes, and the start address (address 0) corresponding to the target data is 0x0000, a value range of a quantity N of read requests that need to be generated by the receive end is [4.5, 5.5). Therefore, N=5, and a start address, a data size, and an end address of data that needs to be read through each read request are shown in the following Table 1.

TABLE 1

| Read request | Start address | End address | Data size (byte) |
| --- | --- | --- | --- |
| The first read request | 0x0000 | 0x0009 | 10 |
| The second read request | 0x000A | 0x0013 | 10 |
| The third read request | 0x0014 | 0x001D | 10 |
| The fourth read request | 0x001E | 0x0027 | 10 |
| The fifth read request | 0x0028 | 0x002C | 5 |

Figure 4:
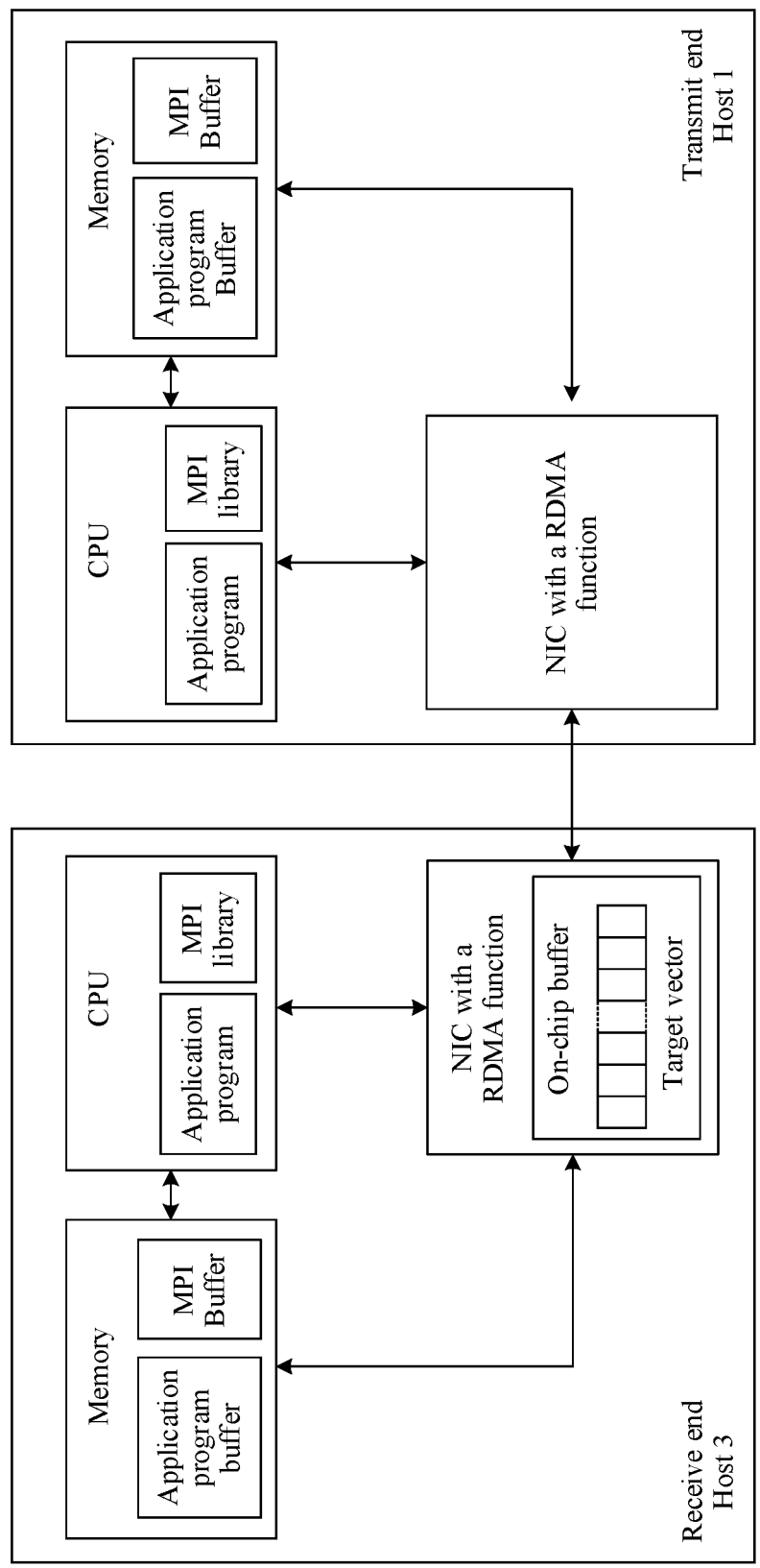
FIG. 4 is a schematic diagram of a structure of another host according to an embodiment of this application.

In this embodiment of this application, after receiving a piece of notification information and generating N read requests based on the notification information, the receive end generates, in an on-chip buffer of a network adapter, a data structure including N bits. As shown in FIG. 4, the N bits are in a one-to-one correspondence with the N read requests. For example, an $i^{th}$ bit in the N bits corresponds to an $i^{th}$ read request in the N read requests, where i is an integer greater than 0 and less than or equal to N. The N bits have a same initial value. After receiving data corresponding to a read request, the receive end changes a preset value of a bit that is in a data structure and that corresponds to the read request. This indicates that the data corresponding to the read request is received. For example, initial values of the N bits are all 0. When receiving data corresponding to a read request whose sequence number is 5, the receive end changes a value of a fifth bit in the data structure to a preset value 1, indicating that data corresponding to the fifth read request is received. When all bits in the data structure are 1, it indicates that the receive end has read all of the target data.

In an embodiment, each read request may include a start address and a destination address of data that needs to be read through the read request. This is not specifically limited in this embodiment of this application.

S303: The receive end determines a target quantity of read requests sent to the transmit end.

In this embodiment of this application, because an ingress bandwidth of the receive end is limited, an amount of data that can be received by the receive end per unit of time needs to be less than or equal to the bandwidth. Therefore, after the transmit end receives the read request, a data amount of a response message returned based on the read request per unit of time needs to be less than or equal to the ingress bandwidth of the receive end. Because a size of data read through each read request is L, the receive end may control, by controlling a quantity of read requests sent each time, the data amount of the response message returned by the transmit end per unit of time based on the received read request.

For example, the receive end determines, based on the ingress bandwidth and the size L of the data read through each read request, that a maximum quantity of read requests that can be sent by the receive end each time is $K \leq BW*T/L$, where BW is the ingress bandwidth of the receive end, and T is a periodicity of sending a read request by the receive end. To be specific, within the periodicity T, an amount of data that is allowed to pass through an ingress of the receive end is a data amount corresponding to response messages for K read requests. If the receive end sends K read requests each time, and a quantity of response messages received by the receive end through the read requests is less than or equal to K within a periodicity T of sending the K read requests, an amount of data received by the receive end per unit of time is not greater than the ingress bandwidth of the receive end. It may be understood that, after receiving the notification message sent by the transmit end, the receive end may send K read requests to the transmit end for the first time.

The receive end may not receive the response messages for the K read requests within the periodicity T of sending the K read requests each time. In this case, if the receive end does not receive response messages for some previously sent read requests during each sending of the read request after sending the read requests for the first time, and the receive end still sends K read requests to the transmit end, after the receive end sends K read requests this time, a quantity of read requests for which response messages are not received by the receive end may exceed K. Consequently, within a next periodicity T, the receive end may receive response messages for more than K read requests, and an amount of data that needs to pass through the ingress of the receive end within the periodicity T exceeds the data amount corresponding to the response messages for the K read requests. This causes congestion at the ingress of the receive end.

Therefore, after the receive end sends the read request for the first time and when the receive end send one or more read requests for a $n^{th}$ time, there is a need to ensure that, after one or more read requests are sent for a $(n-1)^{th}$ time, a sum of a quantity of read requests for which response messages are not received in the read requests sent for (n−1) times and a quantity of the read requests that are sent for the $n^{th}$ time is less than or equal to K, where n is an integer greater than or equal to 2. This ensures that a quantity of response messages received within a periodicity T after the receive end sends the read requests for the $(n-1)^{th}$ time and before the receive end sends the read requests for the $n^{th}$ time is less than or equal to K. To be specific, this ensures that a quantity of read requests for which response messages are not received after the receive end sends the read requests each time is less than or equal to K. The receive end needs to collect statistics on a quantity R of response messages received within the periodicity T after the receive end sends the read requests for the $(n-1)^{th}$ time and before the receive end sends the read requests for the $n^{th}$ time. During n-th sending, a quantity of read requests that can be sent by the receive end is the quantity R of the response messages after the receive end sends the read requests for the $(n-1)^{th}$ time and before the receive end sends the read requests for the $n^{th}$ time.

For example, a maximum quantity of read requests that can be sent by the receive end each time is 100. The receive end may send 100 read requests to the transmit end for the first time. After sending the read requests for the first time and before sending one or more read requests for a second time, the receive end receives response messages corresponding to 90 read requests, and fails to receive response messages corresponding to 10 read requests. Therefore, the receive end sends a maximum of 90 read requests for the second time. This ensures that a quantity of response messages received by the receive end is less than or equal to 100 after the receive end sends the read requests for the second time and before the receive end sends one or more read requests for a third time. Therefore, an amount of data that passes through the ingress of the receive end within a time interval T between two adjacent transmissions of read requests does not exceed a data amount corresponding to 100 response messages.

S304: The receive end sends a target quantity of read requests to the transmit end.

The receive end determines, according to the method in step S303, a target quantity of read requests sent to the transmit end each time, and sends the target quantity of read requests to the transmit end based on the target quantity determined each time, until the receive end sends all of the generated read requests.

For example, as shown in FIG. 4, a host 1 needs to send data to a host 3, a size of the data that the host 1 needs to send is 5 MB, and a value of an MTU of a data link is 2 KB. In this case, the host 3 needs to send $5*2^9$ read requests to the transmit end, and a size of data read through each read request is 2 KB. The host 3 creates, in buffer space of the NIC, a data structure including $5*2^9$ bits, where a value of each bit is 0. If an ingress bandwidth of the host 3 is 8 Mbps, that is, an ingress of the host 3 can receive 1 MB data per second, corresponding to data read through 512 read requests, a periodicity T of sending, by the host 3, read requests to the host 1 is 0.5 second. After generating $5*2^9$ read requests, the host 3 sends 256 read requests to the host 1 for a first time. Before the host 3 sends one or more read requests to the host 1 for a second time, the host 3 has received responses for 240 read requests among the 256 read requests sent for the first time, and receives no response for the remaining 16 read requests. Therefore, when the host 3 sends only 240 read requests for the second time, to ensure that within a next periodicity after the host 3 sends the read requests for the second time, an amount of data received by the host 3 is less than or equal to a half of the ingress bandwidth of the host 3. When the host 3 sends one or more read requests for a third time, if the host 3 has received responses for the 256 read requests within the previous periodicity, the host 3 may send 256 read requests for the third time. The rest may be deduced by analogy until all of the $5*2^9$ read requests are sent.

S305: The transmit end receives the read request sent by the receive end, and obtains data corresponding to each read request from memory space based on each read request.

After receiving the read request from the receive end, a network adapter at the transmit end obtains, based on a start address and a size of each read request, data corresponding to each read request from the memory space of the transmit end. For example, if a start address in a read request received by the transmit end is 0x0014, and a size of data that needs to be read through the read request is 2K bytes, the transmit end acquires 2K-byte data starting from a memory address 0x0014.

S306. The transmit end sends the data corresponding to each received read request to the receive end.

After obtaining the corresponding data according to each read request, the network adapter at the transmit end encapsulates the data into a data packet by adding information such as a sequence number of the corresponding read request, an address of the receive end, and necessary routing, and then sends the data packet to the receive end. Each data packet further includes a sequence number of a read request corresponding to data in the data packet. Data packets are transmitted to the receive end via dynamic routing on the data link.

S307: The receive end receives a response message corresponding to each read request sent by the transmit end, and writes the received response message into a buffer provided by an application program.

The foregoing response message carries data read through the read request, and a data packet corresponding to each response message includes a sequence number of the read request corresponding to the data packet. After receiving a data packet corresponding to a read request, the receive end obtains a sequence number in the received data packet, and changes a value of a bit that corresponds to the sequence number and that is in the foregoing data structure based on the sequence number in the data packet. For example, an initial value of each bit in the data structure is 0, and when receiving a data packet whose sequence number is 3, the receive end sets the third bit in the data structure to 1. Then, the receive end determines an address of an application program buffer requested by an application program, and writes the received packet into the application program buffer.

After determining that the value of each bit in the foregoing data structure is changed, the receive end determines that reading of the foregoing target data is completed. Then, the receive end determines that all data preceding to the target data has been submitted to the application program, and notifies the application program that the target data has been received.

When the transmit end needs to send data to the receive end, the transmit end notifies the receive end of a size and address information of the data that needs to be sent, and the receive end reads, from the transmit end through an RDMA read request, the data that needs to be sent by the transmit end. This can avoid a problem that in the foregoing method based on credit control for the receive end, the ingress bandwidth of the receive end is wasted because the transmit end cannot respond to a credit message of the receive end in time. In addition, the receive end generates a plurality of RDMA read requests based on the ingress bandwidth of the receive end and the size of the data read through each RDMA read request, and sends the plurality of RDMA read requests to the transmit end in several times, to control a data amount returned by the transmit end within a periodicity based on the RDMA read requests. This avoids traffic flapping on a network and avoids congestion at the ingress of the receive end because a data amount received by the receive end per unit of time exceeds the ingress bandwidth.

In an embodiment, a same receive end may simultaneously read target data from a plurality of transmit ends. Each time sending a read request, the receive end also determines, according to the method in step S303, a quantity of read requests sent each time, and then sends a corresponding quantity of read requests to the transmit end. The read request sent by the receive end each time may be a read request sent to a single transmit end, or may include a read request sent to the plurality of foregoing transmit ends. For example, the receive end needs to read target data from three transmit ends: a first transmit end, a second transmit end, and a third transmit end. The receive end may alternately send read a request corresponding to each of the three transmit ends. For example, after sending a read request corresponding to the first transmit end this time, the receive end sends a read request corresponding to the second transmit end next time, and then sends a read request corresponding to the third transmit end next time. The receive end may alternatively send a read request corresponding to each of the three transmit ends during each sending of the read request, and a quantity of read requests corresponding to each transmit end accounts for one third of a quantity of read requests sent each time.

In an embodiment, a same receive end may simultaneously read a plurality of pieces of target data from one transmit end. After the receive end generates a plurality of corresponding read requests based on the plurality of pieces of target data, each time sending a read request, the receive end determines, according to the method in step S303, a quantity of read requests sent each time, and then sends a corresponding quantity of read requests to the transmit end. The read request sent by the receive end each time may be a read request corresponding to a single piece of target data, or may include read requests corresponding to the plurality of foregoing pieces of target data. This is not specifically limited in this embodiment of this application. For example, the receive end needs to read three pieces of target data. The receive end successively receives a notification message corresponding to a first piece of target data, a notification message corresponding to a second piece of target data, and a notification message corresponding to a third piece of target data. The receive end generates 300 read requests based on the first piece of target data, generates 400 read requests based on the second piece of target data, and generates 600 read requests based on the third piece of target data. The receive end may first send the 300 read requests corresponding to the first piece of target data to the transmit end, then send the 400 read requests corresponding to the second piece of target data to the transmit end, and then send the 600 read requests corresponding to the third piece of target data to the transmit end. The receive end may alternatively send a read request corresponding to each of the three pieces of target data alternately. For example, after sending a read request corresponding to the first piece of target data this time, the receive end sends a read request corresponding to the second piece of target data next time, and then sends a read request corresponding to the third piece of target data next time. The receive end may alternatively send a read request corresponding to each of the three pieces of target data each time when sending a read request, and a quantity of read requests corresponding to each piece of target data accounts for one third of a quantity of read requests sent each time.

If a same transmit end simultaneously sends a plurality of pieces of target data to a same receive end, when the transmit end needs to send a piece of target data, the transmit end sends a notification message to the receive end. The notification message includes an identifier of the target data, a size of the target data, and a start address of the target data. Each time after receiving a notification message, the receive end generates a plurality of read requests and a data structure according to the method in step S302, and records address information of each data structure and an identifier of target data corresponding to each data structure. After the transmit end receives the read request, a data packet sent by the transmit end carries the identifier of the target data and a sequence number of the data packet. After receiving a data packet, the receive end determines, based on an identifier of target data in the data packet, address information of a data structure corresponding to the data packet, finds the data structure based on the address information of the data structure, and changes, based on a sequence number in the data packet, a bit corresponding to the data structure to a preset value. When values of data in a data structure are the preset value, the receive end determines that complete data of target data corresponding to the data structure is received.

In an embodiment, in step S303, after sending the read requests to the transmit end for the first time, the receive end may not periodically send a read request. After receiving responses for a preset quantity of read requests, the receive end sends the preset quantity of read requests to the transmit end.

It should be noted that the operations corresponding to the receive end in the step S301 to step S307 are performed by a network adapter that is in the receive end and that supports an RDMA function. An operation corresponding to the transmit end is performed by a network adapter that is in the transmit end and that supports an RDMA function.

Figure 5:
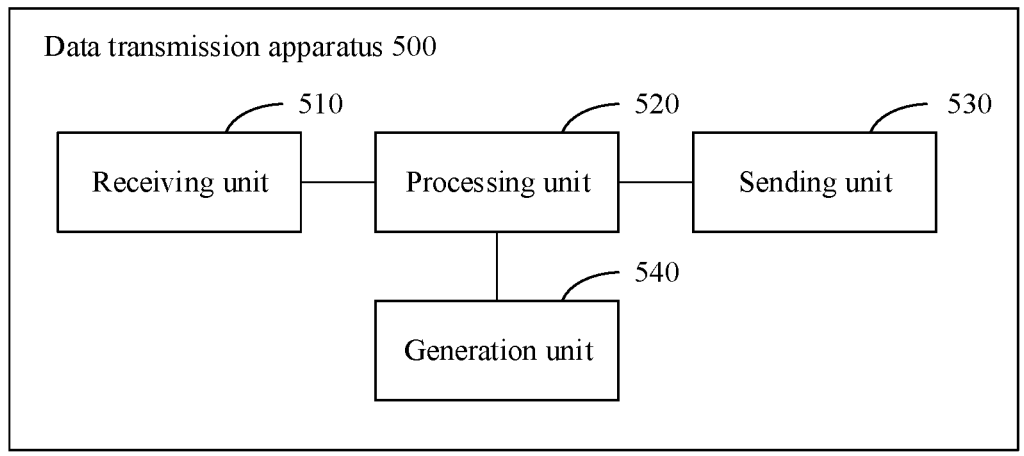
FIG. 5 is a schematic diagram of a structure of a network adapter according to an embodiment of this application.

The foregoing describes in detail the data transmission method provided in embodiments of this application with reference to FIG. 1 to FIG. 4. The following describes a data transmission apparatus and a device provided in embodiments of this application with reference to FIG. 4 and FIG. 5. FIG. 5 is a schematic diagram of a structure of a data transmission apparatus according to an embodiment of this application. The data transmission apparatus is a network adapter. The network adapter 500 includes a receiving unit 510, a processing unit 520, and a sending unit 530. The receiving unit 510 and the sending unit 530 are configured to communicate with a transmit end.

The receiving unit 510 is configured to receive notification information that is about to-be-transmitted data and that is sent by a transmit end, where the notification information includes a size of the to-be-transmitted data. The receiving unit 510 is configured to perform a receiving action of the receive end in the foregoing method embodiments, for example, receive notification information sent by the transmit end in step S302, and receive data corresponding to each read request sent by the transmit end in step S307.

The processing unit 520 is configured to generate a plurality of read requests based on the size of to-be-transmitted data.

The sending unit 530 is configured to send the plurality of RDMA read requests to the transmit end, where a bandwidth occupied by data read through the plurality of sent RDMA read requests is less than or equal to an ingress bandwidth of the receive end.

For example, for a specific method for generating the plurality of read requests by the processing unit 520 based on the size of the to-be-transmitted data, refer to the method for generating the plurality of read requests by the receive end based on the size of the to-be-transmitted data in step S302. For a method for determining, by the processing unit 520, a quantity of read requests sent to the transmit end each time, refer to the description in step S303. Details are not described herein again. The sending unit 530 is configured to perform the foregoing step of sending, by the receive end, the read requests to the transmit end in step S304. Details are not described herein again.

The receiving unit 510 is further configured to receive a response message sent by the transmit end for the read request, where the response message carries data read through the read request.

The network adapter 500 further includes a generation unit 540, configured to: after the processing unit 520 generates the plurality of read requests based on the notification message, generate a data structure, where the data structure includes a plurality of bits, and one of the plurality of bits corresponds to one of the plurality of read requests.

The processing unit 520 is further configured to: after the network adapter 500 receives a response message for a read request, change a bit that is in a data structure and that corresponds to the read request to a preset bit value, to indicate that the response message for the read request is received.

For example, for a specific operation of implementing data transmission by the network adapter 500, refer to the operations performed by the receive end in the foregoing method embodiments. For example, the processing unit 520 is configured to perform the operations performed by the receive end in step S302 to step S307. Details are not described herein again.

Figure 6:
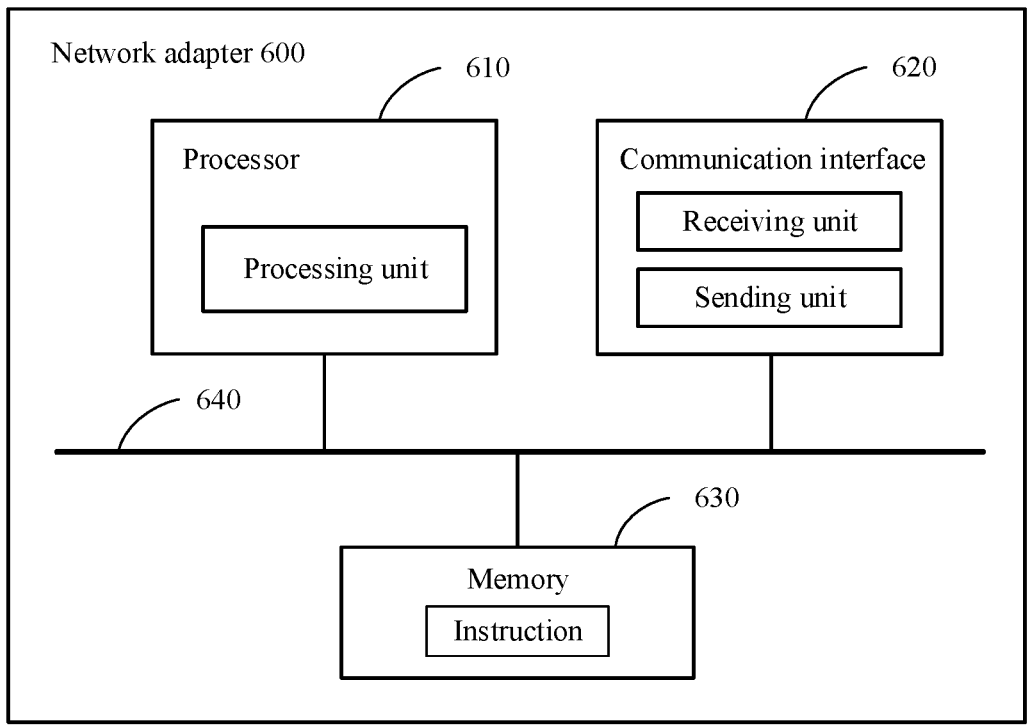
FIG. 6 is a schematic diagram of a structure of another network adapter according to an embodiment of this application.

FIG. 6 is a schematic diagram of a structure of a network adapter according to an embodiment of this application. The network adapter 600 includes a processor 610, a communication interface 620, and a memory 630. Optionally, the processor 610, the communication interface 620, and the memory 630 are connected to each other through a bus 640.

The processor 610 is configured to implement operations performed by the processing unit 520. For specific implementations of the operations performed by the processor 610, refer to specific operations performed by the receive end in the foregoing method embodiments. For example, the processor 610 is configured to perform the operation of generating the plurality of RDMA read requests based on the size of to-be-transmitted data in step S302, the operation of determining the quantity of RDMA read requests sent to the transmit end each time in step S303, and the like. Details are not described herein again.

The processor 610 may have a plurality of specific implementation forms. For example, the processor 610 may be a CPU, or the processor 610 may be a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 610 may alternatively be implemented independently by using a logic device with built-in processing logic, for example, an FPGA or a digital signal processor (DSP).

The communication interface 620 may be a wired interface or a wireless interface, and is configured to communicate with another module or device. The wired interface may be an Ethernet interface or a local interconnect network (LIN). The wireless interface may be a cellular network interface, a wireless local area network interface, or the like.

In this embodiment of this application, the communication interface 620 performs operations implemented by the receiving unit 510 and the sending unit 530, for example, may be configured to receive the notification information sent by the transmit end in step S302, send the RDMA read requests to the transmit end in step S304, and receive the data corresponding to each read request sent by the transmit end in step S307. Specifically, for an action performed by the communication interface 620, refer to an action of receiving or sending by the receive end in the foregoing method embodiments. Details are not described herein again.

The memory 630 may be a non-volatile memory, for example, a read-only memory (read-only memory, ROM), a programmable read-only memory (PROM), an erasable programmable read-only memory (EPROM), an electrically erasable programmable read-only memory (EEPROM), or a flash memory. The memory 630 may also be a volatile memory. The volatile memory may be a random access memory (RAM), and is used as an external cache.

The memory 630 may be configured to store instructions and data, so that the processor 610 invokes the instructions stored in the memory 630 to implement an operation performed by the processing unit 520, for example, the operations performed by the receive end in the foregoing method embodiments. In addition, the network device 600 may include more or fewer components than those shown in FIG. 6, or may have different component configuration manners.

The bus 640 may be a peripheral component interconnect (PCI) bus, an extended industry standard architecture (EISA) bus, or the like. The bus 640 may be classified into an address bus, a data bus, a control bus, and the like. For ease of representation, only one thick line is used to represent the bus in FIG. 6, but this does not mean that there is only one bus or only one type of bus.

For example, for specific implementations of performing various operations by the network adapter 600, refer to specific operations performed by the receive end in the foregoing method embodiments. Details are not described herein again.

An embodiment of this application further provides a non-transient computer readable storage medium. The computer readable storage medium stores a computer program. When the computer program runs on a processor, the method steps performed by the receive end in the foregoing method embodiments may be implemented. For specific implementations of the method steps performed by the processor of the computer storage medium, refer to specific operations of the receive end in the foregoing method embodiments. Details are not described herein again.

The foregoing embodiments are described from respective focuses. For a part that is not described in detail in an embodiment, refer to related descriptions in other embodiments.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, like a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

Steps in the methods in embodiments of this application may be sequentially scheduled, combined, or deleted according to an actual requirement. Modules in the apparatus in embodiments of this application may be divided, combined, or deleted according to an actual requirement.

Embodiments of this application are described in detail above. The principles and implementations of this application are described herein by using specific examples. The description about the embodiments is merely provided to help understand the method and core ideas of this application. In addition, a person of ordinary skill in the art can make variations and modifications in terms of the specific implementations and application scopes based on the ideas of this application. Therefore, the content of this specification shall not be construed as a limit to this application.

What is claimed is:

1. A data transmission method, comprising:
   receiving, by a receive end, notification information that is about to-be-transmitted data and that is sent by a transmit end, wherein the notification information comprises a size of the to-be-transmitted data;
   generating, by the receive end, a plurality of remote direct memory access (RDMA) read requests based on the size of the to-be-transmitted data;
   sending, by the receive end, the plurality of RDMA read requests to the transmit end, wherein a bandwidth occupied by data read through the plurality of sent RDMA read requests is less than or equal to an ingress bandwidth of the receive end; and
   receiving, by the receive end, a response message sent by the transmit end for the plurality of RDMA read requests, wherein the response message carries data read by each of the plurality of RDMA read requests.

2. The method according to claim 1, wherein the sending, by the receive end, the plurality of RDMA read requests to the transmit end comprises:
   after the receive end receives the notification information, determining a quantity N of the plurality of the RDMA read requests sent to the transmit end for a first time, wherein the quantity N is determined by the receive end based on the ingress bandwidth of the receive end and a size of data read through each of the plurality of RDMA read requests, wherein N an integer greater than or equal to 2; and
   sending, by the receive end, the N RDMA read requests to the transmit end.

3. The method according to claim 2, wherein the sending, by the receive end, the plurality of RDMA read requests to the transmit end comprises:

after the receive end sends the N RDMA read requests to the transmit end for the first time, and before the receive end sends one or more RDMA read requests to the transmit end for an $n^{th}$ time, determining, by the receive end, a quantity M of response messages received after the receive end sends one or more RDMA read requests to the transmit end for an $(n-1)^{th}$ time, wherein n is an integer greater than or equal to 2, M is an integer greater than or equal to 1;

determining, by the receive end based on the quantity of the response messages, a quantity X of RDMA read requests that are sent for the $n^{th}$ time, wherein X is an integer greater than or equal to 1; and sending, by the receive end to the transmit end, the X RDMA read requests that are sent for the $n^{th}$ time.

4. The method according to claim 1, wherein after the generating, by the receive end, a plurality of RDMA read requests based on the size of the to-be-transmitted data, the method further comprises:

generating, by the receive end, a data structure, wherein the data structure comprises a plurality of bits, and each of the plurality of bits corresponds to one of the plurality of RDMA read requests;

after the receive end receives a response message, for each RDMA read request, changing a bit that is in the data structure and that corresponds to the RDMA read request to a preset bit value, to indicate that the response message for the RDMA read request is received; and when all bits in the data structure are the preset bit value, determining, by the receive end, that transmission of the to-be-transmitted data is completed.

5. A network adapter, comprising a processor and a memory, wherein the memory is configured to store instructions, the processor is configured to execute the instructions, and when the processor executes the instructions, the processor is configured to:

receive notification information that is about to-be-transmitted data and that is sent by a transmit end, wherein the notification information comprises a size of the to-be-transmitted data;

generate a plurality of remote direct memory access (RDMA) read requests based on the size of the to-be-transmitted data;

send the plurality of RDMA read requests to the transmit end, wherein a bandwidth occupied by data read through the plurality of sent RDMA read requests is less than or equal to an ingress bandwidth of the receive end; and receive a response message sent by the transmit end for the RDMA read request, wherein the response message carries data read by the RDMA read request.

6. The network adapter according to claim 5, wherein when performing the sending operation, the processor is further configured to:

determine a quantity N of the plurality of the RDMA read requests sent to the transmit end for a first time after receiving the notification information, wherein the quantity N is determined by the receive end based on the ingress bandwidth of the receive end and a size of data read through each of the plurality of RDMA read requests, wherein N an integer greater than or equal to 2; and send the N RDMA read requests to the transmit end.

7. The network adapter according to claim 6, wherein when performing the sending operation, the processor is further configured to:

after sending the N RDMA read requests to the transmit end for the first time, and before the receive end sends one or more RDMA read requests to the transmit end for an $n^{th}$ time, determine, a quantity M of response messages received after sending one or more RDMA read requests to the transmit end for an $(n-1)^{th}$ time, wherein n is an integer greater than or equal to 2, M is an integer greater than or equal to 1;

determine, based on the quantity of the response messages, a quantity X of RDMA read requests that are sent for the $n^{th}$ time, wherein X is an integer greater than or equal to 1; and send, to the transmit end, the X RDMA read requests that are sent for the $n^{th}$ time.

8. The method according to claim 5, wherein after generating a plurality of RDMA read requests based on the size of the to-be-transmitted data, the processor is further configured to:

generate a data structure, wherein the data structure comprises a plurality of bits, and each of the plurality of bits corresponds to one of the plurality of RDMA read requests;

after receiving a response message, for each RDMA read request, change a bit that is in the data structure and that corresponds to the RDMA read request to a preset bit value, to indicate that the response message for the RDMA read request is received; and when all bits in the data structure are the preset bit value, determine that transmission of the to-be-transmitted data is completed.

9. A non-transitory computer-readable storage medium, wherein the computer-readable storage medium stores a computer program, and when the computer program is executed by a receive end, the receiving end perform the method of:

receiving notification information that is about to-be-transmitted data and that is sent by a transmit end, wherein the notification information comprises a size of the to-be-transmitted data;

generating a plurality of remote direct memory access (RDMA) read requests based on the size of the to-be-transmitted data;

sending the plurality of RDMA read requests to the transmit end, wherein a bandwidth occupied by data read through the plurality of sent RDMA read requests is less than or equal to an ingress bandwidth of the receive end; and receiving a response message sent by the transmit end for the RDMA read request, wherein the response message carries data read by the RDMA read request.

10. The storage medium according to claim 9, wherein the sending the plurality of RDMA read requests to the transmit end comprises:

determining a quantity N of the plurality of the RDMA read requests sent to the transmit end for a first time after receiving the notification information, wherein the quantity N is determined by the receive end based on the ingress bandwidth of the receive end and a size of data read through each of the plurality of RDMA read requests, wherein N an integer greater than or equal to 2; and sending the N RDMA read requests to the transmit end.

11. The storage medium according to claim 10, wherein the sending the plurality of RDMA read requests to the transmit end comprises:

after sending the N RDMA read requests to the transmit end for the first time, and before sending one or more RDMA read requests to the transmit end for an $n^{th}$ time, determining a quantity M of response messages received after the receive end sends one or more RDMA read requests to the transmit end for an $(n-1)^{th}$ time, wherein n is an integer greater than or equal to 2, M is an integer greater than or equal to 1;

determining, based on the quantity of the response messages, a quantity X of RDMA read requests that are sent for the $n^{th}$ time, wherein X is an integer greater than or equal to 1; and sending, to the transmit end, the X RDMA read requests that are sent for the $n^{th}$ time.

12. The storage medium according to claim 9, wherein after generating the plurality of RDMA read requests based on the size of the to-be-transmitted data, the method further comprises:

generating a data structure, wherein the data structure comprises a plurality of bits, and each of the plurality of bits corresponds to one of the plurality of RDMA read requests;

after receiving a response message for each RDMA read request, changing a bit that is in the data structure and that corresponds to the RDMA read request to a preset bit value, to indicate that the response message for the RDMA read request is received; and when all bits in the data structure are the preset bit value, determining that transmission of the to-be-transmitted data is completed.

\* \* \* \* \*